(12) United States Patent
Smullin et al.

(10) Patent No.: US 10,969,317 B2
(45) Date of Patent: Apr. 6, 2021

(54) HARDNESS TESTING SYSTEM USING MULTIPLE DEPTH MEASUREMENTS AND RELATED METHODS

(71) Applicant: X Development LLC, Mountain View, CA (US)

(72) Inventors: Sylvia Joan Smullin, Menlo Park, CA (US); Michael Jason Grundmann, San Jose, CA (US)

(73) Assignee: X Development LLC, Mountain View, CA (US)

(\*) Notice: Subject to any disclaimer, the term of this patent is extended or adjusted under 35 U.S.C. 154(b) by 260 days.

(21) Appl. No.: 16/103,147

(22) Filed: Aug. 14, 2018

(65) Prior Publication Data
US 2020/0056970 A1 Feb. 20, 2020

(51) Int. Cl.
*G01N 3/42* (2006.01)
*G01N 3/06* (2006.01)

(52) U.S. Cl.
CPC ............ *G01N 3/42* (2013.01); *G01N 3/068* (2013.01); *G01N 2203/0078* (2013.01); *G01N 2203/021* (2013.01); *G01N 2203/0206* (2013.01)

(58) Field of Classification Search
None
See application file for complete search history.

(56) References Cited

U.S. PATENT DOCUMENTS

| 3,084,538 A | * | 4/1963 | Small | G01N 3/42 |
| | | | | 73/83 |
| 3,934,463 A | * | 1/1976 | Venderjagt | G01N 3/42 |
| | | | | 73/81 |

(Continued)

FOREIGN PATENT DOCUMENTS

| CN | 102323170 | 1/2012 |
| CN | 102478474 | 5/2012 |

(Continued)

OTHER PUBLICATIONS

'www.hardnesstesters.com' "Brinell Hardness Testing," Available on or before Aug. 13, 2017 via the Wayback Internet Archive [retrieved on Aug. 8, 2018] Retrieved from Internet URL< https://www.hardnesstesters.com/test-types/brinell-hardness-testing> 5 pages.

(Continued)

*Primary Examiner* — Harshad R Patel
*Assistant Examiner* — Nigel H Plumb
(74) *Attorney, Agent, or Firm* — Fish & Richardson P.C.

(57) ABSTRACT

An apparatus includes a holder to support an indenter relative to a sample, a depth sensor, and a controller. The operations include applying a first force on the sample with the indenter and determining a first depth of the indenter based on data generated by the sensor, moving the indenter from the first depth to a greater predetermined depth, then applying the first force on the sample with the indenter and determining a second depth of the indenter based on second data generated by the sensor, and determining a value indicative of hardness of the sample based on a difference between the first depth and the second depth. The apparatuses described can use a single scale for hardness that enables hardness values for different materials to be compared to one another.

30 Claims, 5 Drawing Sheets

(56) References Cited

U.S. PATENT DOCUMENTS

| | | | | | |
|---|---|---|---|---|---|
| 4,019,376 | A | * | 4/1977 | Iwasaki | G01N 3/42 73/81 |
| 6,279,388 | B1 | * | 8/2001 | Tsujii | G01N 3/42 73/82 |
| 2004/0181304 | A1 | * | 9/2004 | Collier | H01R 13/22 700/121 |
| 2013/0247645 | A1 | * | 9/2013 | Sakaiya | G01N 3/44 73/1.89 |
| 2016/0153881 | A1 | * | 6/2016 | Bellaton | G01Q 60/366 73/82 |

FOREIGN PATENT DOCUMENTS

| | | |
|---|---|---|
| EP | 3306299 | 4/2018 |
| JP | 2015143668 | 8/2015 |

OTHER PUBLICATIONS

'www.instron.us' [online] "Hardness Test," Unknown publication date [retrieved on Aug. 8, 2018] Retrieved from Internet: URL<www.instron.us/en-us/our-company/library/test-types/hardness-test> 4 pages.

ASTM International. "ASTM Standards E10-17: Standard Test Method for Brinell Hardness of Metallic Materials," 2017 [retrieved on Aug. 14, 2018], 32 pages.

ASTM International. "ASTM Standards E103-17: Standard Practice for Rapid Indentation Hardness Testing of Metallic Materials," 2017 [retrieved on Aug. 14, 2018], 5 pages.

ASTM International. "ASTM Standards E18-17: Standard Test Methods for Rockwell Hardness of Metallic Materials," Last revised: Aug. 2017 [ retrieved on Aug. 14, 2018], 38 pages.

Chu et al. "Impression Creep: a new creep test," Journal of Materials Science, vol. 12(11), Nov. 1977, 9 pages.

Devries. "Technologic Papers of the Bureau of Standards: No. 11 Comparison of Five Methods Used To Measure Hardness," Jul. 22, 1912, 29 pages.

Ginder et al. "A Simple Model for Indentation Creep," Journal of the Mechanics and Physics of Solids, vol. 112, Mar. 2018, 11 pages.

Li et al. "The Mechanisms of Indentation Creep," Acta Metallurgica et Materialia, vol. 39(12) Dec. 1991, 12 pages.

Low. "NIST Recommended Practice Guide: Rockwell Hardness Measurement of Metallic Materials," NIST Institute of Standards and Technology, Special Publication 960-5, Jan. 1, 2001, 118 pages.

* cited by examiner

HARDNESS TESTING SYSTEM USING MULTIPLE DEPTH MEASUREMENTS AND RELATED METHODS

TECHNICAL FIELD

This specification relates to hardness testing systems and related methods.

BACKGROUND

Hardness testing systems can be used to assess a hardness of a sample of material. In a Rockwell test, an indenter applies specified loads to a sample of material and the hardness is determined based on the difference between indentation depths at two different points in the loading cycle. In a Brinell test, an indenter applies a load to a sample of material to form an indentation on the sample. An image capture system captures imagery of the indentation so that dimensions of the indentation can be measured. These dimensions of the indentation are used to determine the hardness of the sample.

SUMMARY

In one aspect, an apparatus includes a holder to support an indenter relative to a sample of material, a depth sensor, and a controller to execute instructions for performing operations. The operations include controlling the holder to apply a first force on the sample with the indenter and determining a first depth of the indenter based on first data generated by the depth sensor, controlling the holder to move the indenter from the first depth to a predetermined depth greater than the first depth, after the indenter is moved to the predetermined depth, controlling the holder to apply the first force on the sample with the indenter and determining a second depth of the indenter based on second data generated by the depth sensor, and determining a value indicative of hardness of the sample based on a difference between the first depth and the second depth.

In another aspect, a method for determining hardness of a sample is featured. The method includes applying, with an indenter, a first force on a sample and determining a first depth of the indenter, moving the indenter from the first depth to a predetermined depth greater than the first depth, after the indenter is moved to the predetermined depth, applying, with the indenter, the first force on the sample and determining a second depth of the indenter, and determining a value indicative of hardness of the sample based on a difference between the first depth and the second depth.

Implementations can include the features described below and herein elsewhere.

In some implementations, a drive system configured to move the holder is featured. The apparatus can include the drive system. The depth sensor can include an encoder coupled with the drive system. In some implementations, determining the first depth of the indenter includes determining a position of the indenter based on data generated by an encoder coupled with a drive system configured to move a holder supporting the indenter.

In some implementations, the first data and the second data generated by the depth sensor each include data indicative of a corresponding drive position of the drive system or a corresponding position of the indenter relative to the sample or relative to a support configured to hold the sample relative to the indenter.

In some implementations, the depth sensor includes an optical sensor configured to detect a position of the indenter relative to the sample. In some implementations, determining the first depth of the indenter includes determining a position of the indenter based on data generated by an optical sensor.

In some implementations, a force sensor to measure a force applied to the sample by the indenter is featured. The apparatus can include the force sensor. In some implementations, applying, with the indenter, the first force on the sample and determining the first depth of the indenter includes detecting when the indenter contacts the sample, and determining the first depth of the indenter when the indenter contacts the sample.

In some implementations, the first force is greater than a noise threshold of the force sensor.

In some implementations, a contact sensor to detect when the indenter contacts the sample is featured. The apparatus can include the contact sensor. Controlling the holder to apply the first force on the sample with the indenter and determining the first depth of the indenter can include detecting, using the contact sensor, when the indenter contacts the sample, and determining the first depth of the indenter when the indenter contacts the sample. In some implementations, the contact sensor is a conductivity sensor configured to detect a change in conductivity when the indenter contacts the sample. In some implementations, detecting when the indenter contacts the sample includes detecting a change in conductivity in the indenter. In some implementations, the contact sensor is a force sensor configured to detect a change in force when the indenter contacts the sample. In some implementations, detecting when the indenter contacts the sample includes detecting a change in force when the indenter contacts the sample.

In some implementations, controlling the holder to apply the first force on the sample with the indenter and determining the first depth of the indenter includes controlling the holder to apply the first force with the indenter for less than 1 second. In some implementations, applying, with the indenter, the first force on the sample and determining the first depth of the indenter includes applying, with the indenter, the first force for less than 1 second.

In some implementations, a support to hold the sample is featured. The apparatus can include the support. The support can hold the sample such that the sample is prevented from rotating when the indenter applies a force to the sample.

In some implementations, the predetermined depth is between 50 and 300 micrometers.

In some implementations, controlling the holder to move the indenter from the first depth to the predetermined depth includes causing the indenter to apply a second force when the indenter is moved from the first depth to the predetermined depth. The method or the operations can further include after controlling the holder to move the indenter from the first depth to the predetermined depth, controlling the indenter to maintain the second force applied to the sample by the indenter for 2 to 15 seconds.

In some implementations, moving the indenter from the first depth to the predetermined depth includes causing the indenter to apply a second force when the indenter is moved from the first depth to the predetermined depth. The method or operations can further include after moving the indenter from the first depth to the predetermined depth, maintaining the second force applied to the sample by the indenter for 2 to 15 seconds. In some implementations, controlling the holder to maintain the second force applied to the sample by the indenter for 2 to 15 seconds includes causing the indenter to move from the predetermined depth to a third depth. In some implementations, maintaining the second force applied to the sample by the indenter for 2 to 15 seconds includes causing the indenter to move from the predetermined depth to a third depth. The method or operations can further include determining a value indicative of creep based on a difference between the third depth and the predetermined depth. In some implementations, the value indicative of hardness of the sample is a function of a difference between (i) the difference between the first depth and the second depth and (ii) the difference between the third depth and the predetermined depth.

In some implementations, the value indicative of hardness of the sample is a function of a difference between the first depth and the second depth.

In some implementations, the sample is formed from a material selected from the group consisting of: indium, tin, bismuth, lead, and zinc.

In another aspect, an apparatus includes a holder to support an indenter relative to a sample, a force sensor, and a controller to execute instructions for performing operations. The operations includes controlling the holder to move the indenter to a first predetermined depth into the sample and determining a first force applied by the indenter based on first data generated by the force sensor, controlling the holder to move the indenter from the first predetermined depth to a second predetermined depth into the sample and determining a second force applied by the indenter based on second data generated by the force sensor, and determining a value indicative of hardness of the sample based on the first force, the second force, or both the first force and the second force. The second predetermined depth is greater than the first predetermined depth.

In another aspect, a method of determining hardness of a sample is featured. The method includes moving an indenter to a first predetermined depth into the sample and determining a first force applied by the indenter, moving the indenter from the first predetermined depth to a second predetermined depth into the sample and determining a second force applied by the indenter, and determining a value indicative of hardness of the sample based on at least either the first force or the second force. The second predetermined depth is greater than the first predetermined depth.

Implementations can include the features described below and herein elsewhere.

In some implementations, the operation further include controlling the holder to move the indenter from the second predetermined depth to the first predetermined depth and determining a third force applied by the indenter based on third data generated by the force sensor. In some implementations, the method or operations further include moving the indenter from the second predetermined depth to the first predetermined depth and determining a third force applied by the indenter. In these implementations, the value indicative of the hardness of the sample can be a difference between the first force and the third force.

In some implementations, the value indicative of the hardness of the sample is the second force.

In some implementations, a depth sensor is featured. The apparatus can include the depth sensor. Controlling the holder to move the indenter to the first predetermined depth relative to the sample can include controlling the holder to move the indenter to the first predetermined depth based on first data generated by a depth sensor. Controlling the holder to move the indenter from the first predetermined depth to the second predetermined depth can include controlling the holder to move the indenter based on second data generated by the depth sensor. In some implementations, moving the indenter to the first predetermined depth relative to the sample includes moving the indenter to the first predetermined depth based on first data generated by a depth sensor. Moving the indenter from the first predetermined depth to the second predetermined depth can include moving the indenter based on second data generated by the depth sensor. In some implementations, the first data and the second data generated by the depth sensor each include data indicative of a corresponding drive position of a drive system.

In some implementations, a drive system configured to move the holder is featured. The depth sensor can include an encoder coupled with the drive system.

In some implementations, the depth sensor includes an optical sensor configured to detect a position of the indenter relative to the sample.

In some implementations, the first force is greater than a noise threshold of the force sensor.

In some implementations, a contact sensor to detect when the indenter contacts the sample. The apparatus can include the contact sensor. The method or operations can further include detecting, using the contact sensor, when the indenter contacts the sample, and determining a calibration depth of the indenter when the indenter contacts the sample. Controlling the holder to move the indenter to the first predetermined depth into the sample can include controlling the holder to move the indenter to the first predetermined depth relative to the calibration depth. In some implementations, the method or operations further include detecting when the indenter contacts the sample, and determining a calibration depth of the indenter when the indenter contacts the sample. Moving the indenter to the first predetermined depth into the sample can include moving the indenter to the first predetermined depth relative to the calibration depth.

In some implementations, the contact sensor is a conductivity sensor configured to detect a change in conductivity when the indenter contacts the sample. In some implementations, detecting when the indenter contacts the sample includes detecting a change in conductivity when the indenter contacts the sample.

In some implementations, the contact sensor is a force sensor configured to detect a change in force when the indenter contacts the sample. In some implementations, detecting when the indenter contacts the sample includes detecting a change in force when the indenter contacts the sample.

In some implementations, a support to hold the sample is featured. The apparatus can include the support. The support can hold the sample such that the sample is prevented from rotating when the indenter applies a force to the sample.

In some implementations, the first predetermined depth is between 25 and 200 micrometers.

In some implementations, the second predetermined depth is between 100 and 500 micrometers.

In some implementations, the first predetermined depth is between 25 and 200 micrometers.

In some implementations, the second predetermined depth is between 50 and 500 micrometers.

In some implementations, the sample is formed from a material selected from the group consisting of: indium, tin, bismuth, lead, and zinc.

Advantages of the foregoing may include, but are not limited to, those described below and herein elsewhere.

In some implementations, the hardness testing systems, methods, and apparatuses described herein can use a single scale for hardness that enables hardness values for different materials to be compared to one another. This single hardness scale can have a large dynamic range suitable for a wide range of materials. In contrast to hardness tests that obtain hardness values on different scales for different types of materials, the single scale described herein can be used to identify comparable values for hardness for softer materials, harder materials, or materials having other unique characteristics. For example, traditional Rockwell hardness testing can have multiple scales that are each usable for different types of materials. One scale could be used for softer materials, and another scale could be used for harder materials. Values on these scales cannot easily be compared to one another. With a single scale as described herein, values for hardness of different samples can be compared to one another despite large differences in material characteristics of the sample, e.g., brittleness, softness.

In some implementations, human users can more easily conduct hardness testing for samples having different material properties. Rather than having to change types of indenters based on the types of materials to be tested, users can use a single type of indenter for samples having a wide range of different material properties. In this regard, the hardness testing systems, methods, and apparatuses described herein enable users to test materials without having to perform a complex investigation or determination to identify the type of indenter that should be used for a particular sample.

In some implementations, the hardness testing systems, methods, and apparatuses also enable greater throughput for determining the hardness for samples, particularly compared to traditional systems, methods, and apparatuses that utilize imaging to measure the hardness of samples. These traditional systems, methods, and apparatuses can require indentations on the samples to be separately imaged after the indentations are formed, and thus can require the additional step of removing the samples from the testing systems or devices and then placed on a separate imaging system for imaging the indentations. The hardness testing systems, methods, and apparatuses described herein can avoid this additional step and thus increase the efficiency and throughput of determining the hardness of samples of materials.

In some implementations, the hardness testing systems, methods, and apparatuses can facilitate determination of multiple material characteristics of a sample of material. Rather than having to execute separate procedures to determine different material properties, e.g., elastic modulus, tendency to creep, tendency to plastically deform, hardness, or other material properties, a user can execute a single process in which data sufficient for determining these different material properties are generated.

In some implementations, the hardness testing systems, methods, and apparatuses can simplify the process of preparing samples for hardness testing. For example, the form factors of the samples can be selected to accommodate the predetermined depth to which the indenter is moved during the hardness testing process. Because the predetermined depth is constant between samples having different material properties, the form factors of the samples can be the same for these samples.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Indentation hardness testers can be used to determine a value indicative of hardness of a sample of material. During an indentation hardness test, an indenter contacts a sample of material and is advanced into the sample of material to form an indentation in the sample. For example, the indenter can apply sufficient force on the sample to cause plastic material deformation, thereby forming the indentation. As described herein, during indentation hardness tests for different samples of material, the indenter can penetrate the sample to a predetermined depth within the sample, and a sensor system of the indentation hardness testing system can be used to collect data indicative of a hardness of the samples of material. In particular, the sensor system can take force and depth measurements while the indenter is advanced to the predetermined depth, and these force and depth measurements may be usable to produce values indicative of hardness of the samples.

Figure 1:
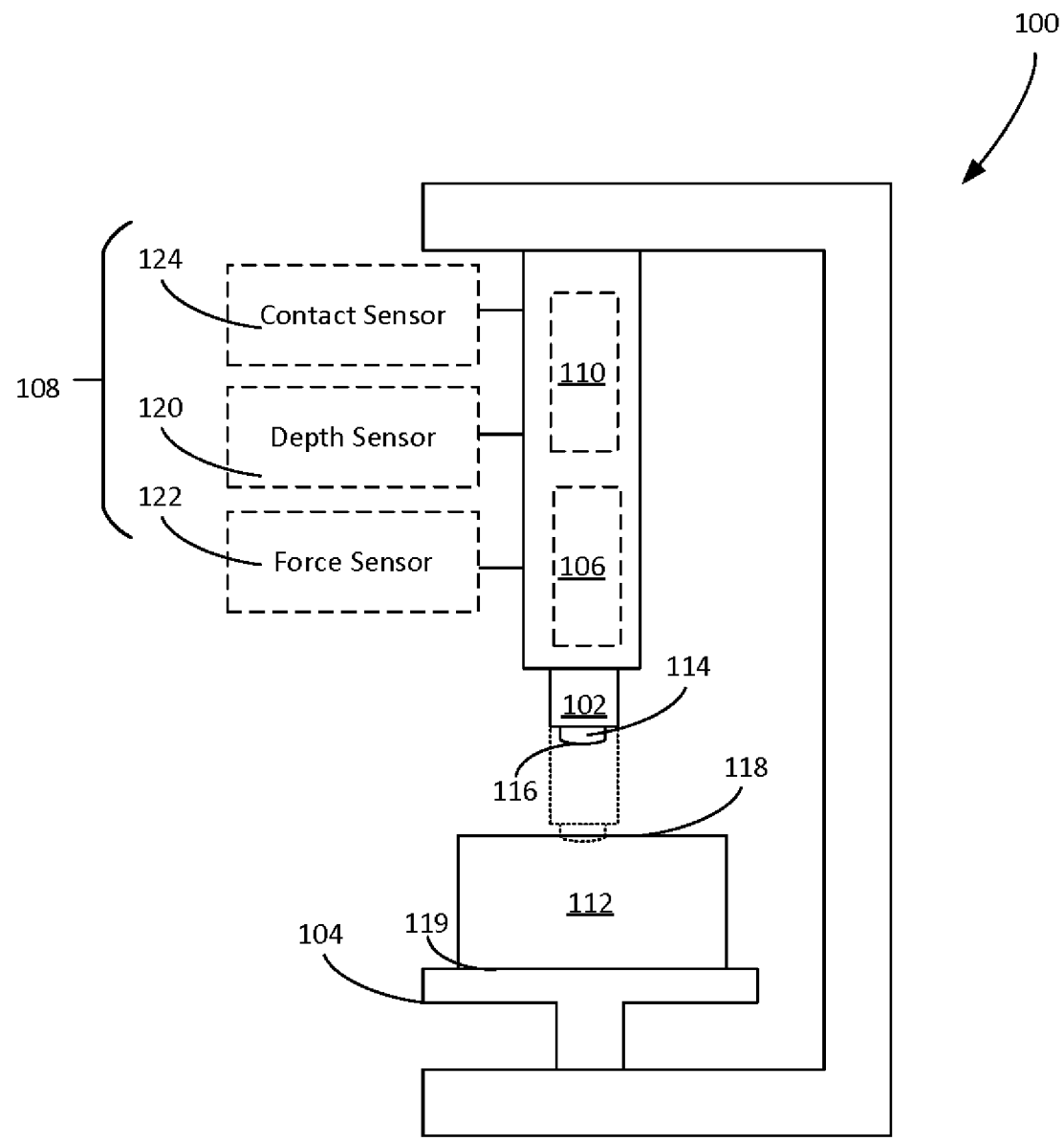
FIG. 1 is a schematic view of an indentation hardness testing system.

Referring to FIG. 1, an indentation hardness testing system 100 includes an indenter holder 102, a support assembly 104, a drive system 106, a sensor system 108, and a controller 110. The indentation hardness testing system 100 can be used to determine a hardness of a sample 112 supported by the support assembly 104 relative to the indenter holder 102. The indenter holder 102 can be controlled by the drive system 106 to produce an indentation on the sample 112, and the sensor system 108 can monitor parameters of the indentation hardness testing system 100 while the indenter holder 102 is controlled to produce the indentation.

The indenter holder 102 is configured to support an indenter 114 relative to the sample 112. The indenter holder 102 is movable relative to the support assembly 104 such that the indenter 114, when carried by the indenter holder 102, can be advanced toward the sample 112 held by the support assembly 104 and penetrate the sample 112. For example, as depicted in FIG. 1, the indenter holder 102 can be drivable by the drive system 106 to advance the indenter 114 toward the sample 112 and to penetrate the sample 112. In some implementations, the indenter holder 102 is vertically movable relative to the support assembly 104.

The indenter 114 is a replaceable piston that is mechanically held by the indenter holder 102. The indenter 114, or at least the portion of the indenter 114 that contacts the sample 112, can be formed of a hard material such as, for example, diamond, a carbide, or steel. The material of the indenter 114 can be harder than material of samples of material to be tested using the indentation hardness testing system 100. A shape of the indenter 114 can vary in implementations. In some implementations, a tip 116 of the indenter 114 is or can include a pyramidal portion, a spheroconical portion, a ball-shaped portion, or other appropriate shape for creating indentation in a sample of material. The indenter 114 can be fixed to the indenter holder 102 through, for example, a threaded engagement, a linchpin engagement, or another appropriate mechanical engagement mechanism. The indenter 114, during an indentation hardness test, is in direct contact with the indenter 114. The tip 116 of the indenter 114 is advanced toward the sample 112, and the tip 116 directly contacts the sample 112 to produce the indentation on the sample 112. For example, the tip 116 can contact a top surface 118 of the sample 112, and is further advanced after contacting the top surface 118 of the sample 112 to form the indentation. As a result, unlike the indenter holder 102 that does not directly contact the sample 112, the indenter 114 directly contacts the sample 112 and thus can experience wear during the indentation hardness test.

The support assembly 104 is configured to support the sample 112 relative to the indenter 114. The support assembly 104 is configured to inhibit other modes of deflection, deformation, and other mechanical behavior of the sample 112 that do not pertain to the indentation hardness of the sample 112. For example, the support assembly 104 can hold the sample 112 in a manner that prevents the sample 112 from rotating. While the support assembly 104 allows for local deflection and deformation around the point of direct contact between the indenter 114 and the sample 112, the support assembly 104 supports the sample 112 such that the sample 112 does not experience substantial amount of deflection and deformation outside of a continuous region surrounding the point of contact between the sample 112. For example, the deformation of the sample 112 can be localized to the area of the indentation formed directly by the indenter 114. In some implementations, the sample 112 rests on the support assembly 104. For example, the support assembly 104 includes a platform on which the sample 112 sits. The platform can support substantially an entirety of a bottom surface 119 of the sample 112. If the bottom surface 119 of the sample 112 is flat, the platform can directly support, for example, 90% to 100% of the bottom surface of the sample 112.

In some implementations, the thickness of the sample 112 can be between κ and 20 times, or more, the maximum depth that the indenter 114 is advanced into the sample 112. The top surface 118 of the sample 112 can be substantially flat.

The drive system 106 includes an actuator coupled to the indenter holder 102. The drive system 106 is operable to drive the indenter holder 102, and thereby drive the indenter 114 when the indenter 114 is held by the indenter holder 102. As described herein, the drive system 106 can be controlled to apply a certain force or move the indenter 114 to a certain depth, e.g., using feedback control from a sensor that detects a force applied by the indenter 114 or that detects a depth of the indenter 114 relative to the top surface 118 of the sample 112. As described herein with respect to a process 300 illustrated in FIG. 3, the drive system 106 is force-controlled at certain operations of the process 300 and is depth-controlled at other operations of the process 300.

The sensor system 108 includes one or more sensors to measure parameters during an indentation hardness test. These parameters can be parameters associated with the indenter 114 and used for controlling the drive system 106, determining a value indicative of a hardness of the sample 112, or both. In the example shown in FIG. 1, the sensor system 108 can generate data indicative of a depth of the indenter 114 and data indicative of a force applied by the indenter 114 to the sample 112. The sensor system 108 can additionally or alternatively detect contact between the indenter 114 and the sample 112. As shown in FIG. 1, the sensor system 108 includes a depth sensor 120, a force sensor 122, and a contact sensor 124.

The depth sensor 120 generates data indicative of a depth of the indenter 114 during an indentation hardness test. The data generated by the depth sensor 120 can include data indicative of a position of the indenter 114 relative to the sample 112 or relative to the support assembly 104. The depth sensor 120 can be used to measure a depth of the indenter 114 relative to the sample 112. For example, the measured depth can be a depth of a portion of the indenter 114, e.g., the tip 116 of the indenter 114, relative to the top surface 118 of the sample 112. In some implementations, the measured depth can be a depth of this portion of the indenter 114 relative to a point of initial contact between the indenter 114 and the sample 112. For example, the depth is measured relative to the position of the indenter 114 when the indenter 114 is advanced toward the sample 112 and contact between the indenter 114 and the sample is detected.

In some implementations, the depth sensor 120 is an encoder associated with the drive system 106. For example, the drive system 106 can include an actuator, e.g., a motor, and the encoder can generate data indicative of a drive position of the actuator. The data indicative of the drive position is indicative of the position of the indenter holder 102 and indicative of the position of the indenter 114 when the indenter 114 is held by the indenter holder 102.

In some implementations, the depth sensor 120 is an optical sensor that measures a position of the indenter 114, e.g., a position of the indenter 114 relative to the sample 112 or relative to the support assembly 104. For example, the optical sensor generates data indicative of a linear position of the indenter 114 and further indicative of a depth of the indenter 114.

The force sensor 122 generates data indicative of a force applied by the indenter 114 to the sample 112. The force sensor 122 can be, for example, a load cell associated with the indenter holder 102 and/or the drive system 106. A force applied by the indenter 114 on the sample 112 or a force applied to the indenter 114 by the drive system 106 is thus detectable by the load cell. The force sensor 122 can be a high-resolution load cell such that forces generated during a process for determining hardness of a sample (as described herein) are greater than a noise threshold of the load cell during the process.

The contact sensor 124 detects when the indenter 114 contact the sample 112, e.g., the top surface 118 of the sample 112. In some implementations, the contact sensor 124 is a conductivity sensor that detects a change in conductivity when the indenter 114 contacts the top surface 118 of the sample 112. In other implementations, the contact sensor 124 is a force sensor that detects a change in force applied by the indenter 114 when the indenter 114 contacts the top surface 118 of the sample 112.

Figure 2:
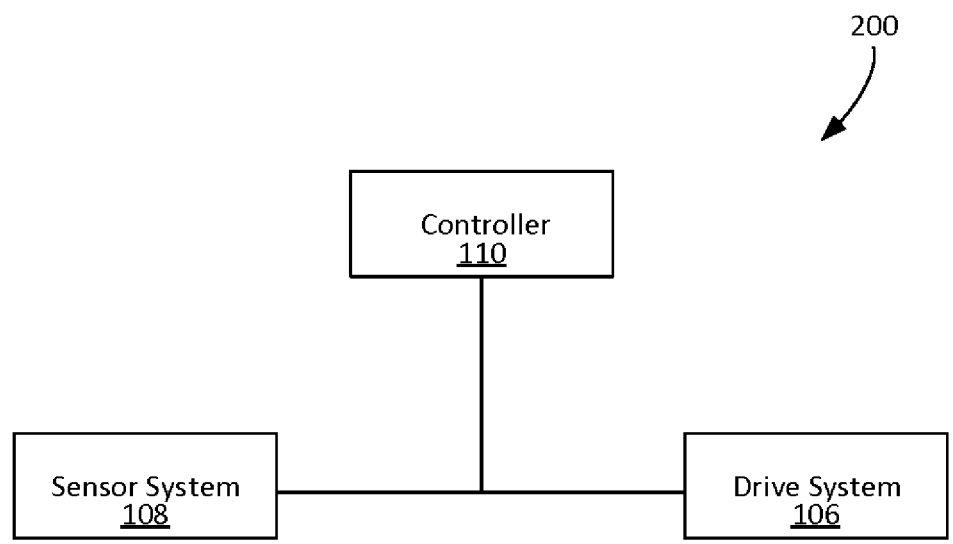
FIG. 2 is a block diagram of a control system of an indentation hardness testing system 100.

Referring to FIG. 2, a control system 200 of the indentation hardness testing system 100 includes the sensor system 108, the drive system 106, and the controller 110. The controller 110 is operably connected to the sensor system 108 and the drive system 106. The controller 110 receives data generated by the sensor system 108 and can use the data to control the drive system 106, e.g., using feedback control processes. The controller 110 can also use the data to determine a value indicative of a hardness of the sample 112.

Figure 3:
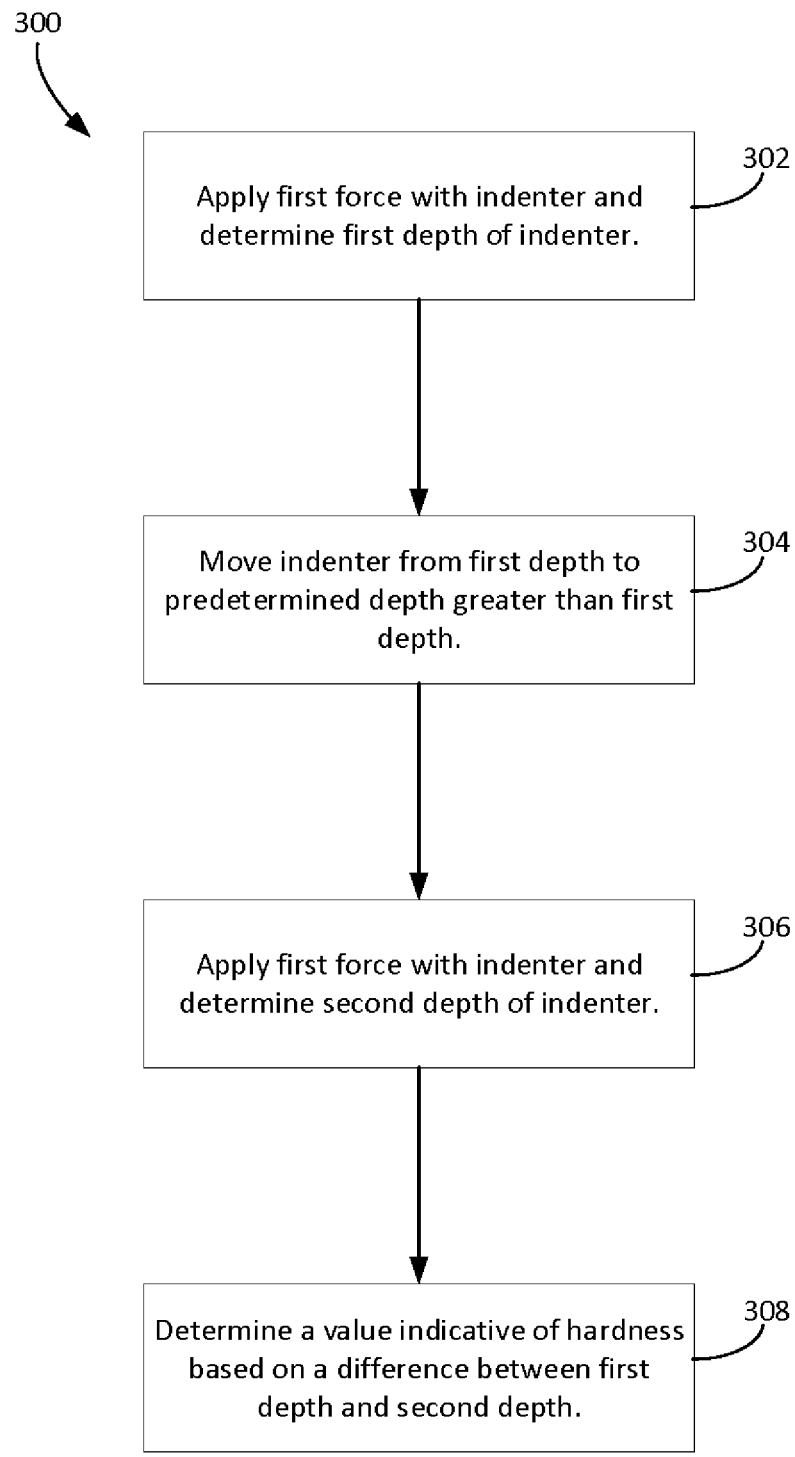
FIG. 3 is a flowchart of a process for determining a value indicative of hardness of a sample of material.

Example processes that can be executed using the indentation hardness testing system 100 or subsystems thereof are described herein. FIG. 3 illustrates a process 300 for determining a hardness of a sample, e.g., the indenter 114. The process 300 includes operations 302, 304, 306, and 308. In some implementations, the process 300 includes fewer or additional operations to determine the hardness of the sample. The process 300 and its operations 302, 304, 306, 308 can be performed by the indentation hardness testing system 100, the controller 110, or some combination of subsystems of the indentation hardness testing system 100. During the process 300, a depth of the indenter 114 and a force applied by the indenter 114 to the indenter 114 is varied over time.

Figure 4:
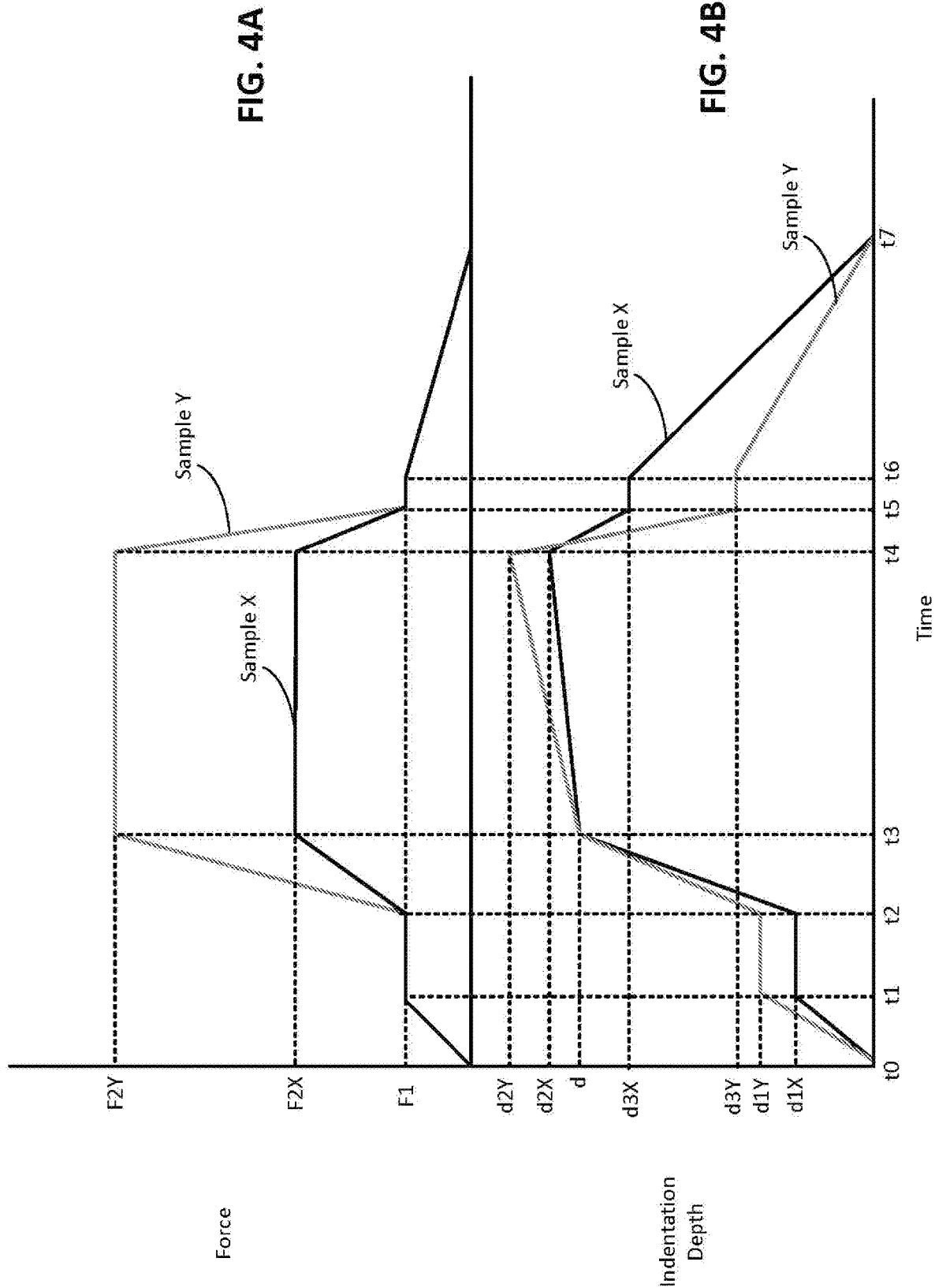
FIG. 4A is a diagram of force measured during a process for determining a value indicative of hardness of a sample of material.
FIG. 4B is a diagram of indenter depth measured during a process for determining a value indicative of hardness of a sample of material.

Plots of forces and depths for two different samples X, Y illustrated in FIGS. 4A and 4B represent examples of such variations in depth of the indenter 114 and force applied by the indenter 114 during the indentation hardness testing process. In the examples depicted in FIGS. 4A and 4B, the samples X, Y have different material properties and respond differently to forces applied by the indenter 114. Relative depths, relative forces, and relative times shown in FIGS. 4A and 4B are for illustration purposes only. In implementations, the changes in depths and forces and the durations of time over which these changes occur can vary.

Before the operation 302 is initiated, the sample X, Y can be prepared for the hardness testing process. For example, a user can place the sample X, Y on the support assembly 104 and install the indenter 114 onto the indenter holder 102. If the indenter holder 102 is movable vertically, the sample X, Y can be placed directly below the indenter 114 such that the indenter 114 can be advanced directly into the sample X, Y.

Referring to FIGS. 3, 4A, and 4B, at the operation 302, a first force F1 is applied to a sample, e.g., one of the samples X, Y, and a first depth d1X, d1Y of the indenter 114 is determined. In this regard, at the operation 302, the indenter 114 can be controlled based on feedback from the force sensor 122. The force sensor 122 can continuously monitor the force applied to the sample to provide for feedback control of the indenter 114. The depth sensor 120 measures the depth as the indenter 114 is advanced into the indenter 114, and the first depth d1X, d1Y is recorded when the indenter 114 applies the first force F1, as detected by the force sensor 122.

As shown in FIG. 4A, the force is increased to the first force F1 from time t0 to time t1. During this same period of time, as shown in FIG. 4B, the indenter 114 is advanced into the sample X, Y to the depth d1X, d1Y. The controller 110 operates the drive system 106 to advance the indenter holder 102 and hence to advance the indenter 114 attached to the indenter holder 102. The indenter holder 102 is controlled in a manner such that the indenter 114 contacts the sample X, Y, penetrates the sample X, Y, and applies the first force F1 to the sample X, Y. The first force F1 applied to the sample X, Y can be measured by the force sensor 122. As depicted in the plot of FIG. 4A, forces applied to the samples X, Y of different materials are the same.

At the operation 302, the first depth d1X, d1Y is determined when the first force F1 is applied to the sample X, Y. In some implementations, at the operation 302, the first force F1 is applied to the sample X, Y and is maintained for a short duration of time, e.g., the time period from t1 to t2 shown in FIGS. 4A, 4B. This short duration of time can be, for example, less than 1 second, less than 500 milliseconds, or less than 250 milliseconds. The first depth d1X, d1Y determined at the operation 302 can be a single depth measurement taken during the duration of time or can be based on multiple depth measurements taken during the duration of time. For example, the first depth d1X, d1Y can correspond to an average of the multiple depth measurements taken during the duration of time.

As described herein, the indentation hardness testing system 100 can include the contact sensor 124 to detect when the indenter 114 contacts the sample X, Y. The first depth d1X, d1Y of the indenter 114 can be determined when the indenter 114 contacts the sample X, Y. For example, when the indenter holder 102 is controlled to apply the first force F1 on the sample X, Y, the contact sensor 124 first detects the contact between the sample 112 and the indenter 114, and then the depth sensor 120 detects the first depth d1X, d1Y of the indenter 114 when this contact is detected.

If the contact sensor 124 is a force sensor, e.g., the force sensor 122 or another force sensor, the first depth d1X, d1Y of the indenter 114 is determined when the force sensor 122 generates data indicative of the contact. In such implementations, a determination of contact between the indenter 114 and the sample X, Y can correspond to an amount of contact resulting in an applied force exceeding a noise threshold of the force sensor 122. The first force F1 applied to the sample X, Y can correspond to the force applied to the sample X, Y when contact between the indenter 114 and the sample X, Y is detected by the contact sensor 124.

For example, if the contact sensor 124 is a force sensor, the first force F1 applied to the sample X, Y can correspond to an amount of force that is sufficient for overcoming noise associated with force measurements. The noise can be instrumental noise, e.g., associated with the force sensor 122, or can be sample noise, e.g., associated with nonuniform features of the sample X, Y. The sample X, Y can include surface features, e.g., surface roughness, that can result in inconsistent measurements of force when the indenter 114 is initially advanced into the sample 112. For example, due to the surface roughness, as the indenter 114 is initially advanced into the sample 112, the measured force can vary nonlinearly. The relationship between the measured force and the measured depth when the indenter 114 is initially advanced into the sample 112 can deviate from typical elastic behavior of materials because of the surface roughness.

The first force F1 applied by the indenter 114 is selected to overcome the noise, e.g., overcome noise associated with the surface features of the sample X, Y and overcome noise associated with the force sensor 122. During the operation 302, the force can be monitored by the force sensor 122, and the controller 110 can continue advancing the indenter holder 102 until the force measured by the force sensor 122 is no less than, e.g., reaches or exceeds, a threshold contact force. The threshold contact force can be less than the first force F1. In some examples, the force being greater than or equal to the threshold contact force indicates that the surface features of the indenter 114 are substantially overcome by the indenter 114. The threshold contact force can be, for example, a value between 0.01 kilogram-force and 2 kilogram-force, e.g., between 0.01 and 0.1 kilogram-force, between 0.1 kilogram-force and 1 kilogram-force, between 0.5 and 1.5 kilogram-force, between 1 and 2 kilogram-force, about 0.05 kilogram-force, about 0.1 kilogram-force, about 0.5 kilogram-force, about 0.9 kilogram-force, about 1 kilogram-force, about 1.5 kilogram-force, or about 2 kilogram-force. In such examples, the threshold contact force can correspond to the force F1.

Alternatively, if the contact sensor 124 is a conductivity sensor, the first force F1 applied to the sample X, Y can correspond to an amount of force applied to the sample X, Y when a measured conductivity is no less than, e.g., reaches or exceeds, a threshold conductivity. The measured conductivity being no less than the threshold conductivity can be indicative of sufficient contact between the sample 112 and the indenter 114 to overcome the noise associated with force measurements.

Referring to both FIGS. 3 and 4B, at the operation 304, after the indenter 114 is moved to the first depth d1X, d1Y, the indenter 114 is moved from the first depth d1X, d1Y to a predetermined depth d greater than the first depth d1X, d1Y. The indenter 114 can be depth-controlled. In this regard, the controller 110 can use depth feedback to control the indenter 114 to be moved to the predetermined depth d. The controller 110 can control the indenter holder 102 to advance the indenter 114 from the first depth d1X, d1Y to the predetermined depth d. The predetermined depth d is selected such that the sample X, Y experiences at least a small amount of plastic deformation.

As shown in FIGS. 4A and 4B, the force of the indenter 114 and the depth of the indenter 114 are increased from the time t2 to the time t3. Unlike at the time t1 in which the first depth d1X, d1Y differs for samples X, Y having different material properties, the indenter 114 is controlled such that the predetermined depth d at the time t3 is constant between samples X, Y having different material properties. The predetermined depth d can vary in implementations. In some implementations, the predetermined depth d can be, for example, 50 to 300 micrometers, e.g., 50 to 150 micrometers, 100 to 200 micrometers, 150 to 250 micrometers, or 200 to 300 micrometers.

In some implementations, a tendency for the sample X, Y to creep can be characterized. When the indenter 114 is moved from the first depth d1X, d1Y at the time t2 to the predetermined depth d at the time t3, the force applied by the indenter 114 on the sample X, Y increases from the first force F1 to the second force F2X, F2Y. The second force F2X, F2Y corresponds to a maximum force applied to the sample X, Y during the process 300. The second force F2X, F2Y can be maintained over a duration of time, e.g., a duration of time extending from the time t3 to the time t4. In this regard, over this duration of time, the indenter 114 is force-controlled. The duration of time can be, for example, 2 to 15 seconds, e.g., 2 to 5 seconds, 5 to 10 seconds, 7.5 to 12.5 seconds, or 10 to 15 seconds. To maintain the second force F2X, F2Y for this duration of time, the controller 110 may increase the depth of penetration of the indenter 114 in order to compensate for creep experienced by the samples X, Y. In particular, from the time t3 to the time t4, the depth of the indenter 114 can be increased from the predetermined depth d to the depth d2X, d2Y due to the creep experienced by the samples X, Y. A difference between the depth d2X, d2Y and the predetermined depth d can be indicative of a tendency to creep. This difference can be indicative of the tendency to creep on a short time-scale, e.g., on the order of seconds or minutes.

At the operation 306, the indenter holder 102 is controlled to apply the first force F1 that was applied at the operation 302, and a second depth d3X, d3Y is determined. For example, after the indenter 114 is moved to the predetermined depth and after the indenter 114 is controlled to apply the second force F2X, F2Y for the duration of time, the indenter 114 is controlled to apply the first force F1 again. During the period of time between the time t4 and the time t5, the force applied on the sample X, Y is decreased to the force F1. As shown in FIGS. 4A and 4B, the first force F1 is applied at the time t5. Even though the first force F1 is applied at both the time t1 and t5, the first depth d1X, d1Y at the time t1 is less than the second depth d3X, d3Y because of the plastic deformation caused at the operation 304. Similar to the operation 304, at the operation 306, the first force F1 can be held for a short duration of time, e.g., the period of time between the time t5 and the time t6.

At the operation 308, a value indicative of hardness can be determined based on a difference between the first depth d1X, d1Y and the second depth d3X, d3Y. This difference in depths can be indicative of an amount of plastic deformation that occurred during the process 300. In particular, the value indicative of hardness can be proportional to the difference in depths. The value indicative of hardness can be determined after the indenter 114 is removed from the sample X, Y or during the process of applying forces to the sample X, Y. The force applied by the indenter 114 can be removed at the time t7, as shown in FIGS. 4A and 4B.

In some cases, in implementations in which the second force F2X, F2Y is maintained for a duration of time, the value indicative of the hardness (H) can be determined based on (i) the difference ($\Delta_A$) between the first depth d1X, d1Y and the second depth d3X, d3Y and (ii) the difference ($\Delta_B$) between the depth d2X, d2Y and the predetermined depth d. H can be determined using a mathematical relationship involving AA and AB. The mathematical relationship can include one or more scalar quantities. For example, the value indicative of hardness (H) can be determined using the equation $H=C+D(\Delta_A-\Delta_B)$, where C and D are scalar quantities. In some examples, the value indicative of the hardness is equal to the difference between $\Delta_A$ and $\Delta_B$ scaled by the scalar quantity D. For example, the difference between the depth d2X, d2Y and the predetermined depth d can be subtracted from the difference between the first depth d1X, d1Y and the second depth d3X, d3Y, and the value indicative of hardness can be proportional to this value. In this example, the scalar quantity C would be 0, and the scalar quantity D could be any appropriate value. In some examples, the value indicative of the hardness is equal to some value proportional to the difference between $\Delta_A$ and $\Delta_B$ and offset by a certain amount (C). The scale quantities C, D, in further examples, can be any positive, negative, or zero value. In other examples, the value indicative of hardness (H) can be determined using the equation $H=C+D(\Delta_A-\Delta_B)^n$, where C and D are scalar quantities, and n is a proportionality constant. For example, n could be 1, 2, 3, or more. In other examples, n could be −1, −2, −3, or less. In other examples, the value indicative of hardness (H) can be determined using the equation $H=C\Delta_A+D\Delta_B$, where C and D are scalar quantities.

A number of implementations have been described. Nevertheless, various modifications may be made.

The indentation hardness testing systems described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations and processes associated with controlling the indentation hardness testing systems described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the indentation hardness testing systems described herein can be implemented using special purpose logic circuitry, e.g., an FPGA (field programmable gate array) and/or an ASIC (application-specific integrated circuit).

The controllers (e.g., the controller 110) described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks. While the controller 110 of the indentation hardness testing system 100 is described as controlling the drive system 106 and performing other operations as described herein, in other implementations, a remote server, or a combination of various controllers described herein can be used to control the operations of the indentation hardness testing system 100.

Figure 5:
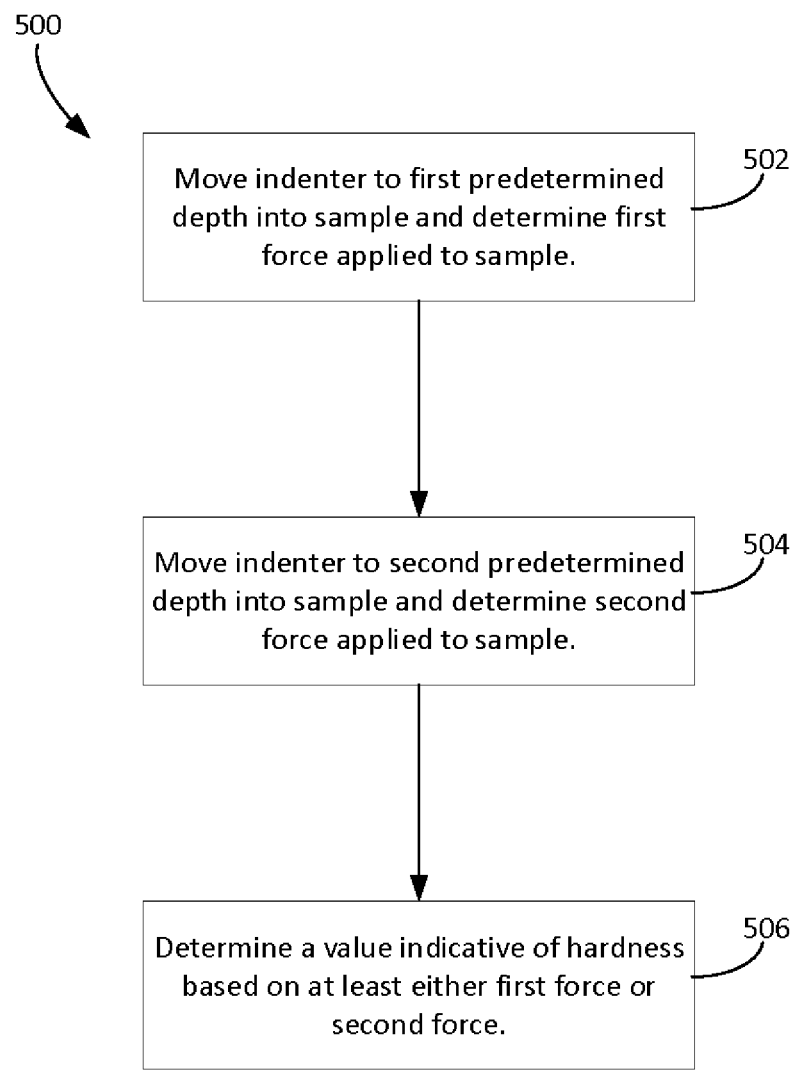
FIG. 5 is a flowchart of another process for determining a value indicative of hardness of a sample of material.

While measured depths d1X, d1Y, d3X, d3Y are described as being used to determine a value indicative of the hardness of the samples X, Y, in other implementations, measured forces can be used to determine a value indicative of a hardness of a sample. FIG. 5 depicts a process 500 in which measured forces are used to determine a value indicative of a hardness of a sample. During the process 500, similar to during the process 300, an indenter, e.g., the indenter 114, is moved to a predetermined depth and a value indicative of hardness is extracted from measurements taken during the process 500. The process 500 and its operations can be performed by an indentation hardness testing system 100 similar to the indentation hardness testing system 100, a controller similar to the controller 110, or some combination of subsystems of an indentation hardness testing system 100. In addition, during the process 500, depths and forces can be measured in a manner similar to how they are measured during the process 300, e.g., using a force sensor and a depth sensor. Unlike the process 300 in which measured depths are used to determine values indicative of hardness of the samples X, Y, in the process 500, measured forces are used to determine values indicative of hardness of a sample. The process 500 includes operations 502, 504, and 506.

At the operation 502, the indenter is moved to a first predetermined depth into a sample, e.g., the indenter 114, and a first force applied by the indenter on the sample is determined. To move the indenter to the first predetermined depth, the controller can control the indenter holder using depth-based feedback control, e.g., using data provided by the depth sensor. Unlike the operation 302 of the process 300, at the operation 502, the first predetermined depth is constant between samples having different material properties. The first predetermined depth can be, for example, between 10 and 100 micrometers, e.g., between 10 and 50 micrometers, 25 and 75 micrometers, or 50 and 100 micrometers. The first force applied at the operation 502 may vary between samples having different material properties and can be, at least in part, indicative of a hardness of the sample. In some implementations, the first predetermined depth corresponds to a depth at which point the indenter contacts the sample.

At the operation 504, the indenter is moved to a second predetermined depth into the sample, and a second force applied by the indenter is determined. In this regard, in order to enable the controller to determine a value indicative of hardness, the indenter is controlled to penetrate the sample to at least two distinct predetermined depths. The second predetermined depth is greater than the first predetermined depth. The second predetermined depth can be, for example, between 50 and 500 micrometers, e.g., between 50 and 250 micrometers, between 100 and 300 micrometers, between 150 and 350 micrometers, between 200 and 400 micrometers, between 250 and 450 micrometers, or between 300 and 500 micrometers. To move the indenter to the second predetermined depth, the controller can control the indenter holder using depth-based feedback control, e.g., using data provided by the depth sensor. The second force corresponds to a maximum force applied during the process 500. In some implementations, the second force can be maintained for a duration of time. In particular, similar to the creep determination performed for the process 500, the second force applied at the operation 504 can be maintained for a duration of time, and a tendency for the sample to creep can be characterized based on a variation in measured depth during the duration of time.

At the operation 506, a value indicative of the hardness of the sample is determined based on at least either the first force or the second force. If the first force is used to determine the value indicative of the hardness, the first force can be used in combination with a third force. For example, the indenter can be moved from the second predetermined depth to the first predetermined depth, and the third force can be determined when the indenter is at the first predetermined depth. This third force differs from the first force measured when the indenter is initially moved to the first predetermined depth at the operation 502 due to plastic deformation caused at the operation 504. A difference between the first force and the third force can be indicative of the hardness of the sample.

If the second force is used to determine the value indicative of the hardness, the second force can correspond to the value. The second force can be indicative of the hardness as well as an elastic modulus of the sample of material. In this regard, the second force can be indicative of both elastic and plastic deformation of the sample of material.

Implementations can include other modifications. For example, the support assembly 104 is described as including a platform. In other implementations, the support assembly 104 can include other support devices for holding the sample 112 in place. For example, the support assembly 104 can include one or more clamps, vise grips, or other support devices for inhibiting the sample 112 from moving during the indentation hardness testing process. In further implementations, at least a portion of the support assembly 104 is deflectable during the indentation hardness process, and the deflection of this portion of the support assembly 104 can be characterized such that depth and force measurements taken by the sensor system 108 account for the deflection.

The indentation hardness testing system 100 of FIG. 1 is depicted as including the contact sensor 124. In some implementations, the contact sensor 124 is a force sensor, e.g., the force sensor 122. In this regard, in some implementations, the indentation hardness testing system 100 includes a single force sensor that serves as both the contact sensor 124 and the force sensor 122.

While FIGS. 4A and 4B depict that forces and depths are held for the same amount of time for the samples X, Y, in other implementations, the amount of time that a sample is held at a particular force or at a particular depth may vary depending on material properties of the sample. Furthermore, in some implementations, the force or depth can be ramped up or ramped down over a shorter or longer period of time for certain samples of materials, e.g., at the operations 302 and 306. In some implementations, the force or the depth are increased at a constant rate over a certain period of time. The period of time can vary for different samples or for different materials.

Materials and material properties of the sample 112 can vary in implementations. In some implementations, the sample 112 is indium, tin, bismuth, lead, zinc, or a combination of these materials.

Accordingly, other implementations are within the scope of the claims.

What is claimed is:

1. An apparatus comprising:
   a holder to support an indenter with respect to a sample of material;
   a depth sensor; and
   a controller to execute instructions for performing operations comprising
      controlling the holder to apply a first force on the sample with the indenter and determining a first depth of the indenter based on first data generated by the depth sensor;
      controlling the holder to move the indenter from the first depth to a second depth greater than the first depth, the second depth being a predetermined depth;
      after the indenter is moved to the second depth, controlling the holder to apply the first force on the sample with the indenter and determining a third depth of the indenter based on second data generated by the depth sensor; and
      determining a value indicative of hardness of the sample based on a difference between the first depth and the third depth.

2. The apparatus of claim 1, further comprising a drive system configured to move the holder, wherein the depth sensor comprises an encoder coupled with the drive system.

3. The apparatus of claim 2, wherein the first data and the second data generated by the depth sensor each comprise data indicative of a corresponding drive position of the drive system.

4. The apparatus of claim 1, wherein the depth sensor comprises an optical sensor configured to detect a position of the indenter with respect to the sample.

5. The apparatus of claim 1, wherein the first data and the second data generated by the depth sensor each comprise data indicative of a corresponding position of the indenter with respect to the sample or relative to a support configured to hold the sample relative to the indenter.

6. The apparatus of claim 1, further comprising a force sensor to measure a force applied to the sample by the indenter.

7. The apparatus of claim 6, wherein the first force is greater than a noise threshold of the force sensor.

8. The apparatus of claim 1, further comprising a contact sensor to detect when the indenter contacts the sample,
   wherein controlling the holder to apply the first force on the sample with the indenter and determining the first depth of the indenter comprises:
      detecting, using the contact sensor, when the indenter contacts the sample, and
      determining the first depth of the indenter when the indenter contacts the sample.

9. The apparatus of claim 8, wherein the contact sensor is a conductivity sensor configured to detect a change in conductivity when the indenter contacts the sample.

10. The apparatus of claim 8, wherein the contact sensor is a force sensor configured to detect a change in force when the indenter contacts the sample.

11. The apparatus of claim 1, wherein controlling the holder to apply the first force on the sample with the indenter and determining the first depth of the indenter comprises controlling the holder to apply the first force with the indenter for less than 1 second.

12. The apparatus of claim 1, further comprising a support to hold the sample such that the sample is prevented from rotating when the indenter applies a force to the sample.

13. The apparatus of claim 1, wherein the predetermined depth is between 50 and 300 micrometers.

14. The apparatus of claim 1, wherein:
   controlling the holder to move the indenter from the first depth to the second depth comprises causing the indenter to apply a second force when the indenter is moved from the first depth to the second depth, and
   the operations further comprise after controlling the holder to move the indenter from the first depth to the second depth, controlling the indenter to maintain the second force applied to the sample by the indenter for 2 to 15 seconds.

15. The apparatus of claim 14, wherein:
   controlling the holder to maintain the second force applied to the sample by the indenter for 2 to 15 seconds comprises causing the indenter to move from the second depth to a fourth depth, and
   the operations further comprise determining a value indicative of creep based on a difference between the fourth depth and the second depth.

16. The apparatus of claim 15, wherein the value indicative of hardness of the sample is a function of a difference between (i) the difference between the first depth and the third depth and (ii) the difference between the fourth depth and the second depth.

17. The apparatus of claim 1, wherein the value indicative of hardness of the sample is a function of a difference between the first depth and the third depth.

18. A method of determining hardness of a sample, the method comprising:
   applying, with an indenter, a first force on a sample and determining a first depth of the indenter;
   moving the indenter from the first depth to a second depth greater than the first depth, the second depth being a predetermined depth;
   after the indenter is moved to the second depth, applying, with the indenter, the first force on the sample and determining a third depth of the indenter; and
   determining a value indicative of hardness of the sample based on a difference between the first depth and the third depth.

19. The method of claim 18, wherein determining the first depth of the indenter comprises determining a position of the indenter based on data generated by an encoder coupled with a drive system configured to move a holder supporting the indenter.

20. The method of claim 18, wherein determining the first depth of the indenter comprises determining a position of the indenter based on data generated by an optical sensor.

21. The method of claim 18, wherein applying, with the indenter, the first force on the sample and determining the first depth of the indenter comprises:

detecting when the indenter contacts the sample, and determining the first depth of the indenter when the indenter contacts the sample.

22. The method of claim 21, wherein detecting when the indenter contacts the sample comprises detecting a change in conductivity in the indenter.

23. The method of claim 21, wherein detecting when the indenter contacts the sample comprises detecting a change in force when the indenter contacts the sample.

24. The method of claim 18, wherein applying, with the indenter, the first force on the sample and determining the first depth of the indenter comprises applying, with the indenter, the first force for less than 1 second.

25. The method of claim 18, wherein the second depth is between 50 and 300 micrometers.

26. The method of claim 18, wherein:

moving the indenter from the first depth to the second depth comprises causing the indenter to apply a second force when the indenter is moved from the first depth to the second depth, and the method further comprises after moving the indenter from the first depth to the second depth, maintaining the second force applied to the sample by the indenter for 2 to 15 seconds.

27. The method of claim 26, wherein:

maintaining the second force applied to the sample by the indenter for 2 to 15 seconds comprises causing the indenter to move from the second depth to a fourth depth, and the method further comprises determining a value indicative of creep based on a difference between the fourth depth and the second depth.

28. The method of claim 27, wherein the value indicative of hardness of the sample is a function of a difference between (i) the difference between the first depth and the third depth and (ii) the difference between the fourth depth and the second depth.

29. The method of claim 18, wherein the sample is formed from a material selected from the group consisting of: indium, tin, bismuth, lead, and zinc.

30. The method of claim 18, wherein the value indicative of hardness of the sample is a function of a difference between the first depth and the third depth.

* * * * *